July 19, 1927.  E. SCOTT  1,636,249
WHIP ACTUATOR
Filed Jan. 7, 1927
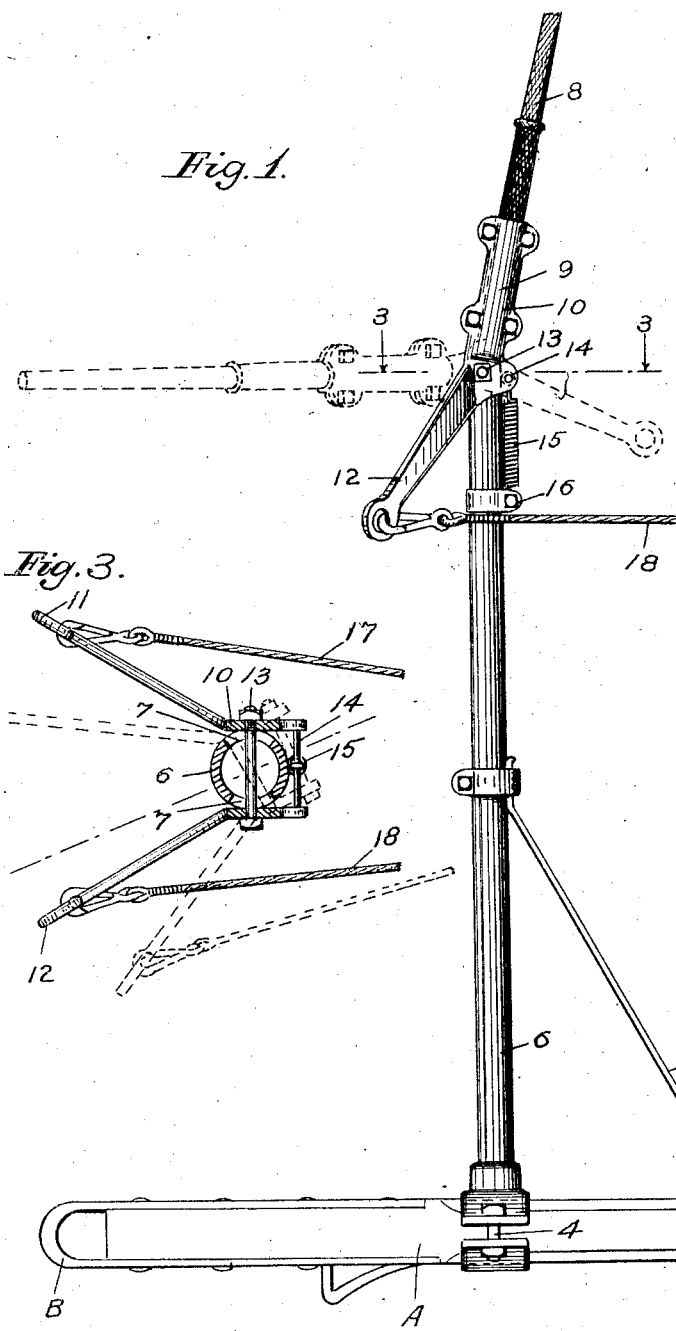
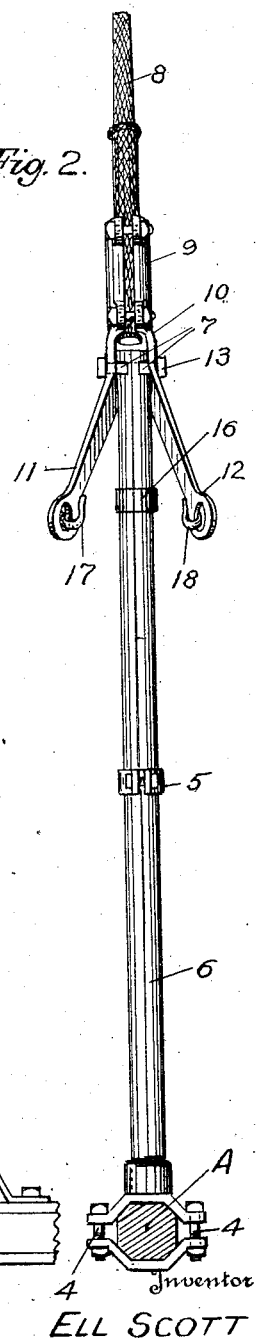
Inventor
ELL SCOTT
By *[signature]*
Attorney Patented July 19, 1927.

1,636,249

UNITED STATES PATENT OFFICE.

ELL SCOTT, OF WALNUT GROVE, MINNESOTA.

WHIP ACTUATOR.

Application filed January 7, 1927. Serial No. 159,608.

This invention relates to whip manipulating devices and the primary object is to provide means of a novel, efficient and practical nature for cracking a whip over, or whipping the horses of a lead or advance team, pulling a load or implement, and which team is frequently beyond the convenient reach of the driver, and consequently, as is well known, will often develop or fall into the habit of lagging and not pulling its share of the load to be drawn. Further and more specific objects will be disclosed in the course of the following specification, reference being had to the accompanying drawing, wherein:

Fig. 1 is a side elevation of my device, showing it as attached to a wagon or implement tongue.

Fig. 2 is a front elevation of the device as shown in Fig. 1.

Fig. 3 is a sectional detail view about as on the line 3—3 in Fig. 1.

Referring to the drawing more particularly and by reference characters, A designates a wagon or implement tongue which extends between the horses of the rear team and is usually supported from their neck yokes. When a lead or second team is to be added, it is arranged in advance of the main or rear team and is customarily hitched by a clevis, either to the bracket B, of the tongue, or to a draft equalizing device at the rear of the tongue. In any event the arrangement of horses is the same, and in order to spur on either or both horses of the lead team, without frightening the rear horses by the crack of a long lash or whip, I provide the device shown, and which may be described as follows:

Suitably secured upon the forward portion of the tongue A, as by clamping bolts 4 and a brace 5, is a standard 6, the upper end of which is provided with a pair of oppositely disposed, segmental slots 7. The handle or butt end of an ordinary whip 8 is detachably secured in the socket 9, of an actuator 10, having a pair of lateral, forwardly inclined and diverging arms 11 and 12. A bolt 13, carried by the actuator 10, extends through the slots 7, and is pivotally as well as oscillatably carried in these slots. Rearwardly of the bolt 13, the actuator is provided with suitable means, such as a pin 14, for connection with one end of a spring 15. The other end of the spring is secured to a collar 16, adjustable on the standard 6, and the object of the spring 15 is to restore and retain the actuator to its initial or primary position, as shown in the drawing. The arms 11 and 12 are respectively connected to pull cords 17 and 18, which extend back to within reach of the driver.

Now, when the driver wishes to whip say the left horse of the lead team he gives a pull on the cord or rope 18. This action rotates the actuator to the left, as indicated by dotted lines in Fig. 3, and also brings the whip smartly down, as indicated by the dotted lines in Fig. 1. When the cord is then released the spring 15, as above mentioned, restores all the parts to their initial positions. It will be obvious that a pull on the cord 17 will bring the whip down upon the right lead team horse, after which it will be similarly restored.

It is understood that suitable modifications may be made in the general design and structural details of the device, as herein disclosed, provided, however, that such modifications come within the spirit and scope of the appended claims.

Having now therefore fully shown and described my invention, what I claim to be new and desire to protect by Letters Patent is:

1. A device of the character described comprising a suitable support, a whip holder carried by the support, and cables for tilting and partly rotating the holder, said holder having downwardly projecting arms to which the cables are applied.

2. A device of the character described comprising a suitable support, a whip holder carried by the support, and means for simultaneously tilting and rotating the holder, said holder having a pair of downwardly projecting relatively rigid arms to which said means is secured.

3. A device of the character described comprising a suitable support, a whip holder carried by the support, said holder having a pair of diverging arms and means for selectively effecting a whip acting movement of the holder to either side by selectively actuating said arms.

4. A device of the character described comprising a standard having a transverse opening therethrough, an actuator carried by the standard and having a socket for a whip, said actuator having a bolt journaled in said opening and having freedom for oscillating movement in a horizontal plane, means for moving the actuator so as to effect a whipping action to the whip, and means for restoring the actuator to its initial position.

5. A device of the character described comprising a standard having a slotted opening through its upper end portion, a whip actuator carried by said upper end portion and having means rotatably engaging said opening with freedom for movement therein in a horizontal plane, and means for operating the actuator to effect a whipping action to a whip held therein.

6. A device of the character described comprising a standard, an actuator carried by the upper end of the standard and having freedom for oscillating movement in vertical and horizontal planes, and means for operating the actuator, said actuator consisting of a pair of laterally disposed, angularly formed members, the upper ends of which have socket formed recesses and the lower ends of which diverge to form terminals for operating devices.

7. A device of the character described comprising a suitable support, a whip holder tiltably and rotatably carried by the support, and means for actuating the holder to effect a whipping action to the whip, said holder having a pair of diverging arms which normally extend forwardly from the holder to form terminals for the actuating means.

In testimony whereof I affix my signature.

ELL SCOTT.